No. 870,844.
PATENTED NOV. 12, 1907.
G. POWELL.
ARMOR FOR TIRES.
APPLICATION FILED DEC. 3, 1906.
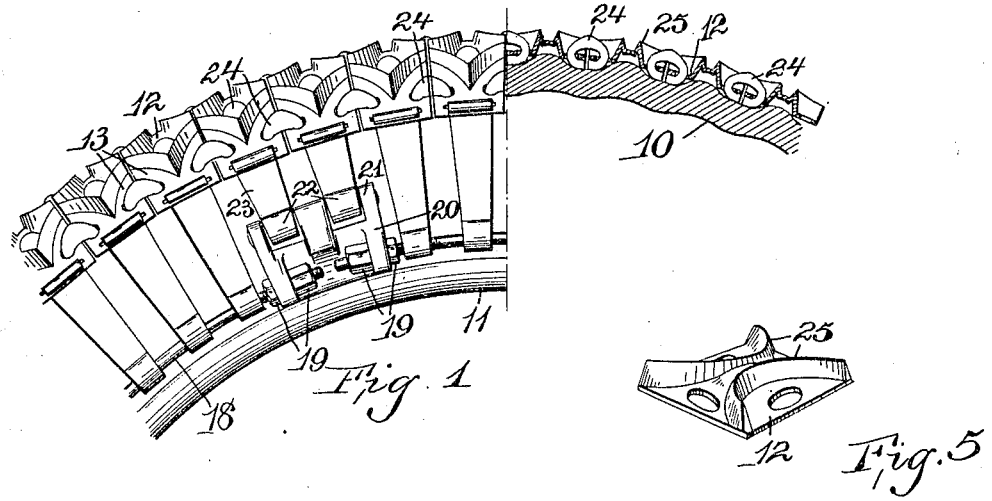
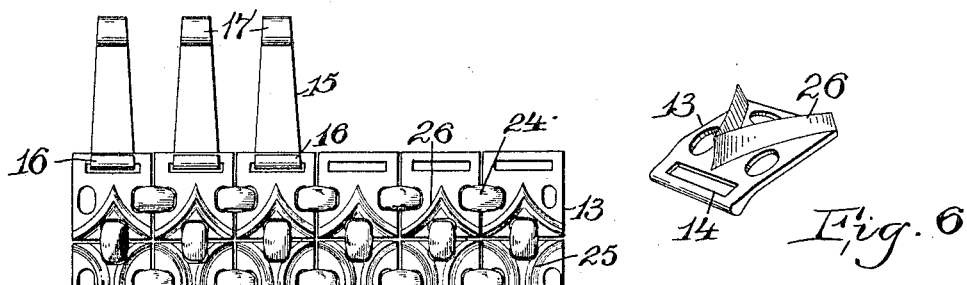
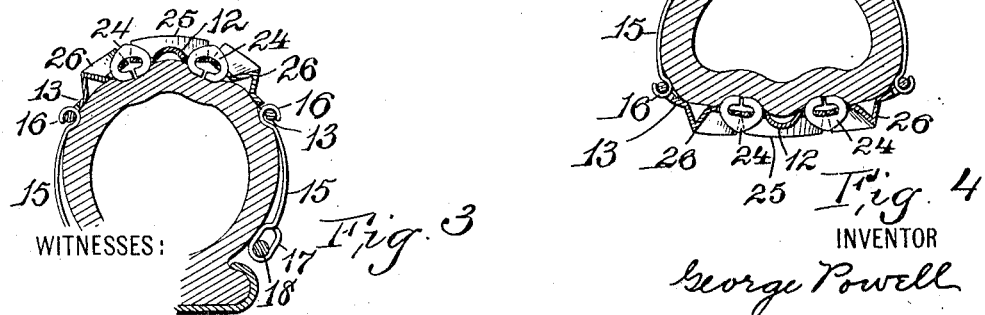
WITNESSES:
E. A. Pell
R. Johnson
INVENTOR
George Powell
BY
Wm. H. Caufield
ATTORNEY

UNITED STATES PATENT OFFICE.

GEORGE POWELL, OF NEWARK, NEW JERSEY.

ARMOR FOR TIRES.

No. 870,844.  Specification of Letters Patent.  Patented Nov. 12, 1907.

Application filed December 3, 1906. Serial No. 346,020.

*To all whom it may concern:*

Be it known that I, GEORGE POWELL, a subject of the King of Great Britain, residing at Newark, in the county of Essex and State of New Jersey, have invented certain new and useful Improvements in Armor for Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an armor for tires, and is designed to provide a metallic covering to prolong the life of the tire, to give better purchase on smooth surfaces, to facilitate the running of a vehicle in snow or loose ground, and to provide a metallic covering of this kind, that is flexible and that will give with the tire, so as to not interfere with the easy riding of the motor car or vehicle to which the tire is attached.

The invention is further designed to provide a ready means for fastening this armor to the tire, and this means also provides for a quick removal of the armor if necessary.

The invention is further designed to provide an armor, of this kind, that is made up of links or plates, preferably of sheet metal, that are provided with suitable projections to increase the traction of the plates, and also embraces a series of links connecting the plates longitudinally and transversely, and these links being also adapted to assist the traction and at the same time maintain the links in their relative positions.

The invention is illustrated in the accompanying drawings, in which

Figure 1 is a part elevation and part section of the armor attached to a tire. Fig. 2 is a top view of a portion of the tire flattened out. Fig. 3 is a transverse section of the armor on the tire, and Fig. 4 is a similar view, but showing the armor adapting itself to the flattened contour of a tire when it engages the ground. Fig. 5 is a perspective view of one of the plates making up the armor, and Fig. 6 is a perspective view of another of the plates.

The armor is attached to an ordinary flexible rubber tire 10 which is held, in any usual way, in a rim 11. The armor is flexible and is composed of a central series of plates 12 flanked by the side plates 13. The side plates are provided, on their outer edges, with the slots 14, and in these slots are hooked the ends 16 of the links 15, the outer end of the links being slotted as at 17, for purposes to be described hereinafter, and passing through the slotted portion 17 of the links, and securing them to the tire, are the wires or rods 18, shown more particularly in Figs. 1, 3 and 4. At a suitable point where the ends of the wires 18 come together, the wires are screw-threaded and engage the nuts 19, shown in Fig. 1, these nuts 19 bearing against the lugs 20, these lugs merging into a plate which has a second series of lugs 21, engaging the short links 23 which are arranged to have their ends 22 also elongated into a loop, and thus secure the armor to the tire, and provide also for adjusting the wire 18 so as to make the inner ends 17 of the links 15 bind close up to the sides of the tire. Securing the side plates and the central series of plates together, both longitudinally and transversely, are the links 24 which pass through slots in the edges of the plates, and are provided, on their outer surfaces, with a projection extending up from the body of the plate so as to form means for engaging a road or surface on which the vehicle is traveling.

The plates are preferably made of sheet metal that is stamped up with any suitable design or configuration to form projections, and I show the central plates 12 stamped up with the projections 25, and the end plates with the projections 26, these being so disposed as to provide a gripping surface, in all directions, so as to give the tire good traction, and at the same time preventing "skidding", now so common in flexible tires.

It will be understood that I do not limit myself to the particular design of the stamping of the plates, as any suitable formation can be given to the raised portions 25 and 26.

This tire armor is very flexible, and conforms to the inflated position of the tire shown in Fig. 3, and also is adapted to flatten out, as in Fig. 4, when the tire portion, to which it is attached, engages the ground. The projections on the outside of the tire form a good grip for the tire on the ground, and the interior projections of the links and the depressions of the portions 25 and 26 allow the tire, on its outer edges, to embed itself, somewhat, in the armor to prevent creeping or displacement of the armor on the tire.

Having thus described my invention, what I claim is:—

1. An armor for tires comprising a series of metal plates having projections on their outside faces, links connecting the plates longitudinally and transversely, the links having projections for engaging the road and on the same side as the plates, and means for securing the edges of the armor to a tire.

2. An armor for tires comprising rows of metal plates having projections thereon, the outside rows of plates having slots in their edges, links, having projections thereon, for securing the plates and rows of plates together, links secured in the slots of the plates, the links having their free ends slotted, and a binding medium passing through the slots of the links.

3. An armor for tires comprising a series of plates of sheet metal formed with indentations on the back and projections on the front, links connecting the plates, the links having projections on one face, links secured to the edges of the armor and having their free ends slotted, wires passing through the slotted ends of the links, and tension devices on the ends of the wires.

4. An armor for tires comprising a series of sheet metal plates formed with indentations on the back and projections on the front, links connecting the plates and having projections thereon, links secured to the edges of the armor, the links having their free ends slotted, wires passing through the slotted ends of the links, plates connected to the edges of the armor, and nuts bearing on the plates and receiving the ends of the wires to attach the armor to a tire.

In testimony, that I claim the foregoing, I have hereunto set my hand this 30th day of November 1906.

GEORGE POWELL.

Witnesses:
WM. H. CAMFIELD,
E. A. PELL.